(12) United States Patent
Takahashi

(10) Patent No.: US 6,466,243 B2
(45) Date of Patent: Oct. 15, 2002

(54) COLOR IMAGE FORMING APPARATUS AND IMAGE FORMING TIMING CONTROL METHOD

(75) Inventor: Masaki Takahashi, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/820,297

(22) Filed: Mar. 29, 2001

(65) Prior Publication Data
US 2001/0026308 A1 Oct. 4, 2001

(30) Foreign Application Priority Data
Mar. 31, 2000 (JP) ......................................... 2000-159189

(51) Int. Cl.$^7$ ................................................ G03G 15/01
(52) U.S. Cl. ........................ 347/116; 347/234; 399/159
(58) Field of Search .................................. 347/116, 232, 347/233, 234, 235; 399/159

(56) References Cited

U.S. PATENT DOCUMENTS

| 5,291,223 A | 3/1994 | Ogane et al. |
| 5,359,434 A | 10/1994 | Nakao et al. |
| 5,905,519 A | * 5/1999 | Brenner et al. ............ 347/116 |

FOREIGN PATENT DOCUMENTS

| JP | 4-54235 B2 | 8/1992 |
| JP | 4-255815 | * 9/1992 |
| JP | 4-321066 | * 11/1992 |
| JP | 5-119571 | 5/1993 |
| JP | 6-102460 | * 4/1994 |
| JP | 2000-137358 | 5/2000 |
| JP | 2000-158715 | 6/2000 |

* cited by examiner

Primary Examiner—Joan Pendegrass
(74) Attorney, Agent, or Firm—Oblon, Spivak, McClelland, Maier & Neustadt, P.C.

(57) ABSTRACT

An image forming timing control method is applied to a color image formation relating a photosensitive base having a photosensitive surface and a reflecting surface besides the photosensitive surface. In this method, a plurality of exposure light beams are applied onto an orbit along which the reflecting surface moves. Specifically, the plurality of exposure light beams are deflected, i.e., width of the scanning of the plurality of exposure light beams are increased, and the plurality of exposure light beams are provided onto the reflecting surface. The plurality of exposure light beams reflected by the reflecting surface are detected, and timings of scanning of latent images on the photosensitive base are determined based on respective time points when the plurality of exposure light beams are detected.

18 Claims, 8 Drawing Sheets

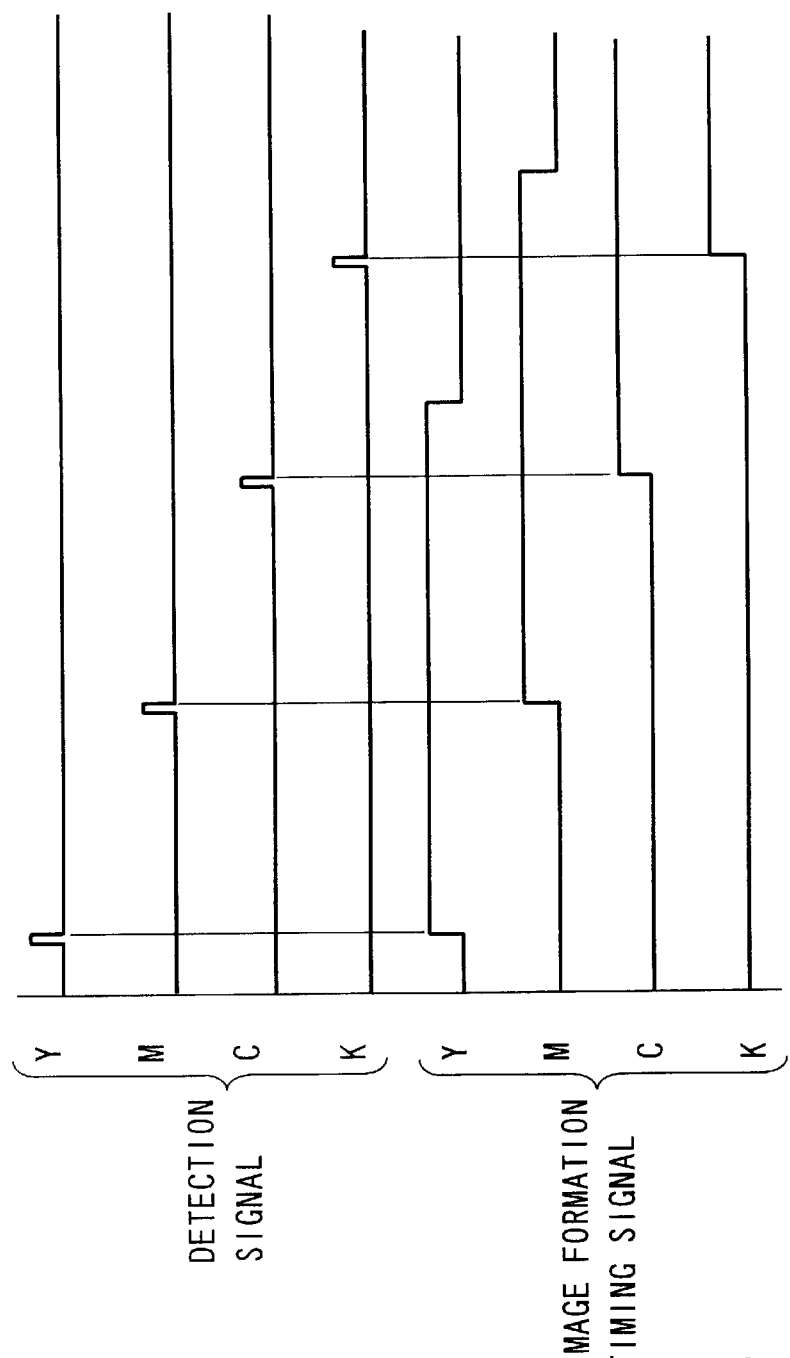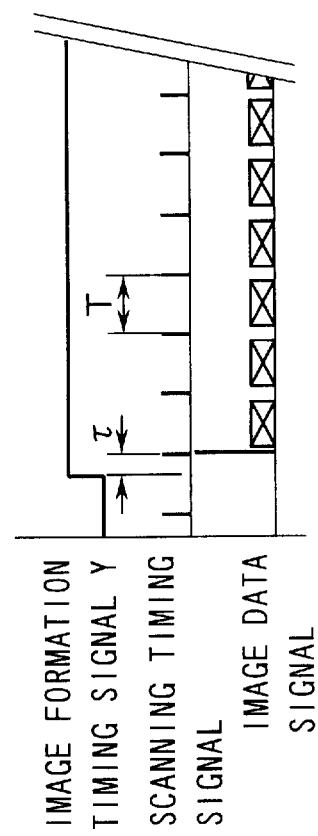
FIG. 10A
FIG. 10B

COLOR IMAGE FORMING APPARATUS AND IMAGE FORMING TIMING CONTROL METHOD

CROSS-REFERENCE TO RELATED APPLICATIONS

This application is based upon and claims the benefit of priority from the prior Japanese Patent Application No. 2000-159189, filed Mar. 31, 2000, the entire contents of which are incorporated herein by reference.

BACKGROUND OF THE INVENTION

The present invention relates to a color image forming apparatus and an image forming timing control method, in which images of single colors are formed on an image forming medium and are layered sequentially to form a color image.

There are various methods for forming a color image on an image forming medium such as a paper. For example, known methods are an electronic photograph method in which electrostatic images (electrostatic latent images) are formed on a photosensitive drum and are transferred onto a paper by toner to visualize the images, an inkjet method in which ink drops are directly injected to a paper to form an image, silver salt photograph method in which an image is recorded by exposing a photosensitive coloring material, and the like.

In any of the above-described methods, images of single colors need to be layered precisely to prepare an excellent color image. If the precision of the layering is not sufficient, there appears deterioration of image quality, such as blurring of an image, insufficient sharpness, insufficient color reproductivity, and the like. In general, 0.1 mm or less is the layering precision at which dislocations in layering are not observed conspicuously with eyes but high image quality can be obtained.

Conventionally, various proposals have been made to improve the layering precision. For example, there is a technique in which a mark for detecting a dislocation in layering is formed on a conveyer belt for a recording paper and the image forming position is corrected on the basis of the detected dislocation in layering, in a color image forming apparatus having a tandem structure.

However, this technique involves problems such as increased toner consumption due to formation of a mark for detecting a layering dislocation, additional installation of a cleaning device for removing unnecessary marks after detection, which is not related with an output image, deterioration of a photosensitive material due to mechanical stress, elongated recording time due to time loss for detecting a layering dislocation, increased costs due to necessity for a detector for detecting precisely a mark, and increased running costs including totally photosensitive elements and toner.

Also, in the case of realizing a detector capable of precisely detecting a layering dislocation detection mark formed by a toner dot in order to detect a layering error between images of single colors, the detection precision of the detector itself needs to be improved to 0.02 mm or less. This results from consideration of precision allocation due to analysis of factors causing a layering error and error analysis of the structural elements of the image forming apparatus, if the layering dislocation tolerance is set to about 1 mm. At the same time, a plurality of marks must be detected to improve detection precision through statistical processing, because there are changes and variants in the driving precision of the image forming process and structural elements when forming a mark. Thus, not only hardware, including the detector, but also software, such as a detection sequence, is burdened.

On the other side, there is a technique (Japanese Patent Application KOKOKU Publication No. 4-54235) in which synchronization is carried out using one of a plurality of laser beams as a reference.

However, this technique can perform only relative positioning between the laser beams, and therefore, image forming positions determined by relative positions between the photosensitive element and the beams cannot be precisely aligned with each other. A problem hence arises in that image layering precision cannot be improved sufficiently. Also, the structure of the apparatus is complicated because a mechanism is required by which the photosensitive element, which is an expendable component and must be replaced several ten times in the lifetime of the apparatus, must be attached with sufficient precision. Further, the driving speed of the photosensitive element must be set with high precision, so that the photosensitive element must be driven by a drive transmission mechanism with high mechanical precision under highly precise speed control. As a result, a problem arises in that the apparatus costs are increased.

As a technique which solves these problems, Japanese Patent Application No. 10-332848 (corresponding to U. S. patent application Ser. No. 09/429,903) proposes a highly-precise image layering method as follows. In this method, a light reflector for reflecting a write laser beam to the surface of a photosensitive drum is provided. Four laser beams for forming respectively four images, which are reflected from the light reflector, are detected by a light detection sensor and converted into electric signals, which are used for image write timings. According to this method, four images of single colors are formed with the position of the light reflector on the photosensitive drum surface taken as a reference, so that a layered full-color image can have very high layering precision.

However, the width of laser beam scanning for forming an electrostatic latent image on the photosensitive drum surface is designed to be smaller than the width of the photosensitive layer of the photosensitive drum due to limitations such as lens size, lens manufacturing costs, and the like. Therefore, the light reflector must be set on the surface of the photosensitive layer. Although the surface of the photosensitive drum is constantly cleaned by a cleaner or the like, coloring material such as toner sticks to this surface. Consequently, the surface of the light reflector is temporarily covered with toner or the like so that the reflection rate is lowered. If reflection light from the light reflector comes without a sufficient light amount, it can be considered that images cannot be formed. Further, if a light reflector is set on the surface of the photosensitive layer, it is difficult to apply a photosensitive layer in a step of manufacturing a photosensitive drum and an insulation process is required.

BRIEF SUMMARY OF THE INVENTION

Accordingly, it is an object of the present invention to provide a color image forming apparatus and an image forming timing control method, that are capable of correcting image-layering dislocations of a formed color image with high precision, without providing a light reflector on a photosensitive layer, thereby obtaining a color image with high quality at a high speed.

According to one aspect of the present invention, there is provided a color image forming apparatus comprising: a photosensitive base which is rotatable and has a photosensitive layer on a surface of the photosensitive base and a reflecting surface on the surface of the photosensitive base, the reflecting surface disposed besides the photosensitive layer; a scanning unit which scans a plurality of exposure light beams on the photosensitive base, the plurality of exposure light beams corresponding to respective latent images of different colors; a developing unit which develops the plurality of latent images; a deflecting unit which deflects the plurality of exposure light beams and guides the plurality of exposure light beams to an orbit of the reflecting surface; a detecting unit which detects the plurality of exposure light beams reflected by the reflecting surface; and a controller connected to the detecting unit and the scanning unit, and configured to determine timing of scanning of the scanning unit based on respective time points when the plurality of exposure light beams are detected.

According to another aspect of the present invention, there is provided a color image forming apparatus comprising: a photosensitive base which is rotatable, the photosensitive base comprising a photosensitive surface, a non-photosensitive surface, and a reflecting surface formed on the non-photosensitive surface; a scanning unit which scans a plurality of exposure light beams on the photosensitive base, the plurality of exposure light beams corresponding to respective latent images of different colors; a developing unit which develops the plurality of latent images; a deflecting unit which increases width of the scanning of the plurality of exposure light beams and provides the plurality of exposure light beams onto the reflecting surface; a detecting unit which detects the plurality of exposure light beams reflected by the reflecting surface; and a controller connected to the scanning unit and the detecting unit, and configured to determine respective timings of scanning of the scanning unit based on respective time points when the plurality of exposure light beams are detected.

According to still another aspect of the present invention, there is provided an image forming timing control method applied to a color image formation relating a photosensitive base, the photosensitive base comprising a photosensitive surface and a reflecting surface besides the photosensitive surface, comprising: applying a plurality of exposure light beams onto an orbit along which the reflecting surface moves; detecting the plurality of exposure light beams reflected by the reflecting surface; and determining timings of scanning of latent images on the photosensitive base, based on respective time points when the plurality of exposure light beams are detected.

BRIEF DESCRIPTION OF THE SEVERAL VIEWS OF THE DRAWING

FIGS. 10A and 10B are timing charts for explaining the operation of the control circuit in the embodiment.

DETAILED DESCRIPTION OF THE INVENTION

Embodiments of the present invention will now be explained with reference to the drawings.

The first embodiment of the present invention will be explained first.

Figure 1:
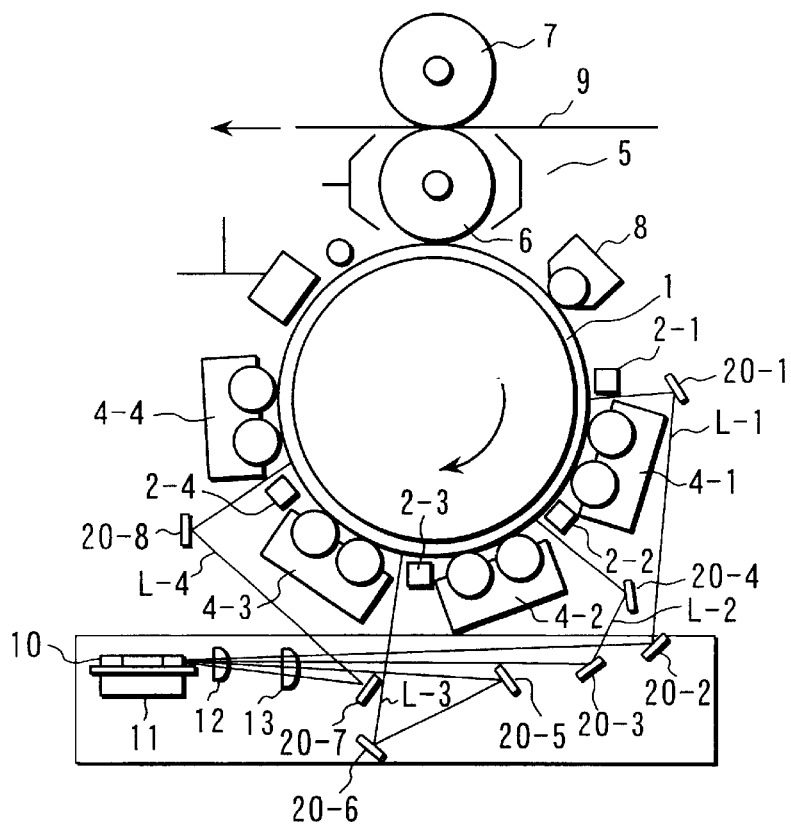
FIG. 1 is a side view showing a schematic structure of a color image forming apparatus according to the first embodiment of the present invention.

FIG. 1 shows the structure of a color image forming apparatus according to the first embodiment of the present invention.

A photosensitive drum 1 as an electrostatic image carrier (photosensitive base substance) is constructed by providing an organic or amorphous-silicon-based photosensitive layer on a cylindrical conductive base. The photosensitive drum 1 is rotated in the arrow direction by a motor not shown, passing sequentially through charge, exposure, and development stations provided at four positions on the photosensitive drum 1, which are distant from each other in a direction of the movement of the surface of the photosensitive drum 1 (in a sub-scanning direction).

The photosensitive layer of the photosensitive drum 1 is changed uniformly by a first charger 2-1 constructed by a corona charger or a scolotron charger. Thereafter, exposure is carried out by irradiating a first exposure laser beam L-1 modulated in accordance with first color image information (e.g., yellow image data) in the front side in the sub-scanning direction of the charger 2-1, thereby forming a first electrostatic latent image on the surface of the photosensitive layer. The electrostatic latent image formed by the first exposure laser beam L-1 is thereafter developed by a first developing device 4-1 containing a liquid developer of the first color (e.g., yellow), thereby forming a visible image of the first color by the liquid developer or toner sticking to the electrostatic latent image.

The visible image of the first color formed by the liquid developer or toner sticking to the electrostatic latent image may be transferred to a recording paper 9 by a transfer device 5. However, in this case, next exposure/development process takes place successively. That is, the photosensitive drum 1 is charged uniformly by a second charger 2-2. Further, a second electrostatic latent image is formed at the same position as the position where the first electrostatic latent image has been formed, by a second exposure laser beam L-2 modulated in accordance with second color image information (e.g., magenta image data). The second electrostatic latent image is developed by a second developing device 4-2 containing a liquid developer of a second color (e.g., magenta) different from that contained in the first developing device 4-1, thereby to form a visible image of the second color. After this development, the visible images of the first and second colors are formed and layered on the photosensitive drum 1.

Subsequently, uniform charging by a third charger 2-3, formation of a third electrostatic latent image by a third exposure laser beam L-3 modulated by third color image information (e.g., cyan image data), and formation of a visible image of a third color (e.g., cyan) by a third developing device 4-3 are sequentially carried out in the same manner as described above. Further, uniform charging by a fourth charger 2-4, formation of a fourth electrostatic latent image by a fourth exposure laser beam L-4 modulated by fourth color image information (e.g., black image data), and formation of a visible image of a fourth color (e.g., black) by a fourth developing device 4-4 are also sequentially carried out.

Thus, for example, yellow (Y), magenta (M), cyan (C), and black (K) visible images are layered on the photosensitive drum 1, thereby forming a full-color image. This color image on the photosensitive drum 1 is transferred to a recording paper 9 by a transfer device 5. At this time, the color image on the photosensitive drum 1 may be transferred directly to the recording paper 9. However, this image is transferred to the recording paper 9 through an intermediate transfer medium.

Each of the transfer from the photosensitive drum 1 to the intermediate transfer medium 6 and the transfer from the intermediate transfer medium 6 to the recording paper 9 may be either transfer based on an electric field or transfer based on a pressure (and heat). Although many kinds of liquid developers can generally be fixed to a recording paper at a room temperature, fixture may be carried out by heating the pressure roller 7 as shown in FIG. 1.

Color image forming process as described above is disclosed in, for example, U. S. Pat. No. 5,570,173 or U.S. Pat. No. 5,420,675.

The exposure laser beams L-1 to L-4 for forming electrostatic latent images are deflected by a polygon mirror 10 which is rotated at a high speed by a polygon motor 11, thereby to scan the surface of the photosensitive drum 1 in the direction (main scanning direction) perpendicular to the direction of the movement of the surface of the photosensitive drum 1. These exposure laser beams L-1 to L-4 are light emitted from semiconductor laser devices independent from each other, and are deflected by one same surface on the polygon mirror 10. The beams pass through fθ lenses 12 and 13, and are thereafter respectively oriented to defined positions on the surface of the photosensitive drum 1 by mirrors 20-1 to 20-8.

The fθ lenses 12 and 13 is provided to converge the laser beams L-1 to L-4 to a micro spot of about 0.06 mm on the surface of the photosensitive drum 1, and to keep the scanning speed constant in the main scanning direction of the photosensitive drum 1 during scanning of the surface of the photosensitive drum 1.

Further, electrostatic latent images are formed on the photosensitive drum 1 by modulating (flicker control) the laser beams L-1 to L-4 in accordance with image information of respective colors.

Figure 2:
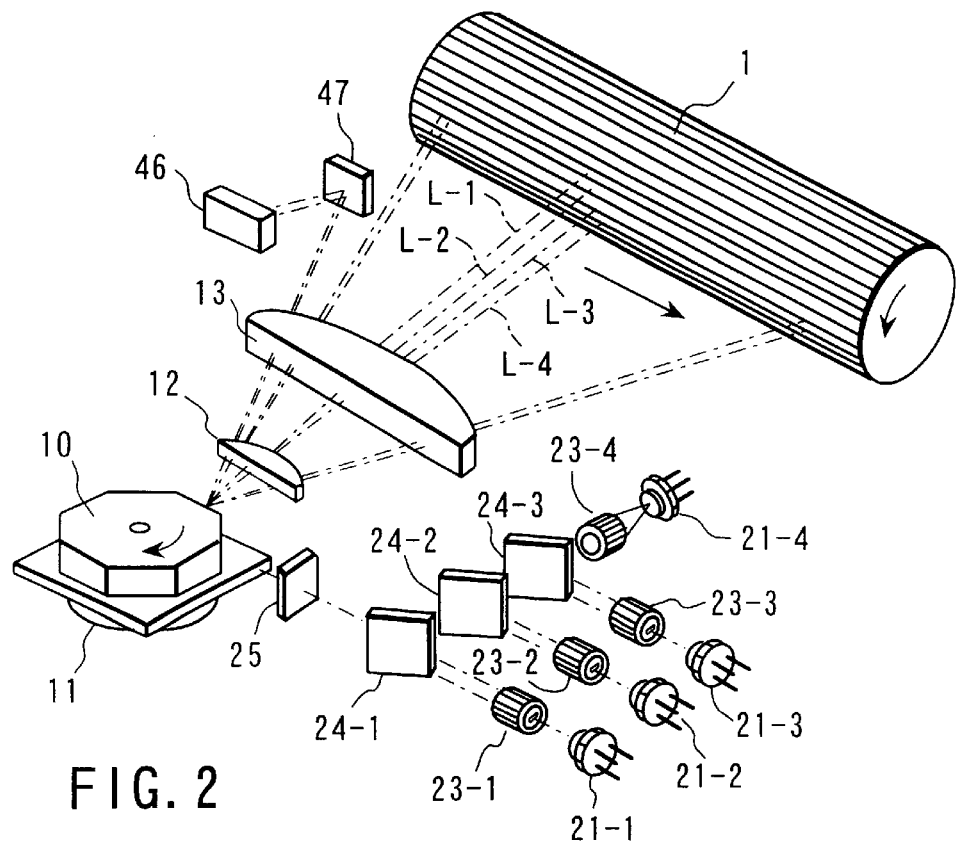
FIG. 2 is a view showing the structure of a laser beam scanning section in the embodiment.

Next, the structure of the scanning system by the exposure laser beams L-1 to L-4 will be explained in more details with reference to FIG. 2. To simplify the explanation, mirrors 20-1 to 20-8 for orienting the laser beams L-1 to L-4 to the photosensitive drum 1 are omitted from FIG. 2.

In the present embodiment, diffusive lights from the four semiconductor laser devices 21-1 to 21-4 are changed into substantially parallel lights by collimator lenses 23-1 to 23-4. Thereafter, the four exposure laser beams L-1 to L-4 are converged to one substantially equal position by half-mirrors 24-1 to 24-3 and are let pass through a cylindrical lens 25, to be irradiated on one same deflection surface of the polygon mirror 10. The scanning system is thus constructed. The exposure laser beams L-1 to L-4 are deflected simultaneously by the deflection surface of the polygon mirror 10, and pass through the fθ lenses 12 and 13 sequentially. Thereafter, the beams are oriented to defined positions on the photosensitive drum 1 at defined incident angles by a mirror not shown.

In this case, the exposure laser beams L-1 to L-4 deflected by the deflection surface of the polygon mirror 10 further pass through the fθ lenses 12 and 13 and are guided to a light detector 46 by the mirror 47, so that the scanning start timings of the laser beams L-1 to L-4 are detected. That is, a detection signal from the light detector 46 corresponds to a scanning timing signal generated for every start of scanning operation by the laser beams L-1 to L-4.

Figure 3:
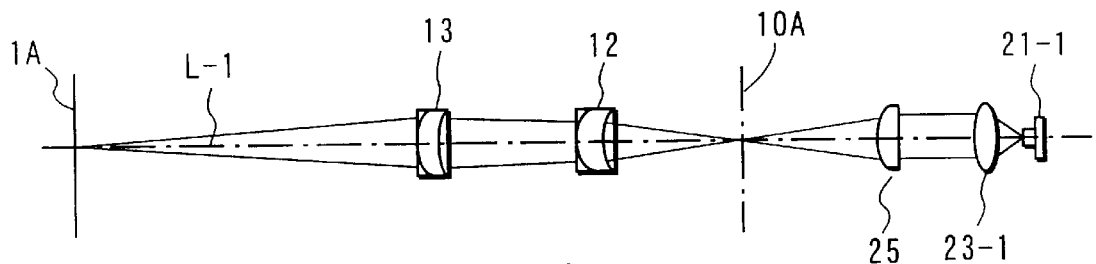
FIG. 3 is a view showing the layout of an optical system of the laser beam scanning section in the embodiment.

FIG. 3 shows a layout of an optical system on he laser beam scanning plane.

Light emitted from the semiconductor laser 21-1 is changed into parallel light by the collimator lens 23-1, and is further converged only in the direction (sub-scanning direction) perpendicular to the main scanning direction by the cylindrical lens 25, thereby to form an image on the polygon mirror deflection surface 10A. Due to the optical characteristics of the fθ lenses 12 and 13, the laser beam deflected by the polygon mirror deflection surface 10A forms an image on the photosensitive drum surface 1A which is conjugate with respect to the polygon mirror deflection surface 10A.

This is the structure for restricting changes of the beams positions on the photosensitive drum surface 1A, which are caused by inclination of the polygon mirror deflection surface 10A. By this structure, unevenness of color density which is called banding is prevented from occurring in the output image because the beam image forming position on the photosensitive drum surface 1A differs for every surface of the polygon mirror 10, even if the polygon mirror deflection surface 10A is not extremely precise.

Next explanation will be made of a structure for correcting relative positions of electrostatic latent images for respective colors in the sub-scanning direction in order to reduce layering dislocation in a color image on the photosensitive drum 1, and particularly, the relative positions of the images of respective colors in the rotating direction of the photosensitive drum 1.

In general, a color image formation apparatus forms a color image by layering single-color images of different colors, which are obtained by visualizing electrostatic latent images formed by the exposure laser beams L-1 to L-4. Therefore, if image forming positions of the laser beams L-1 to L-4 are dislocated from each other on the photosensitive drum 1, the relative positions of the electrostatic latent images of the single-color images are dislocated and cause image layering dislocation when the single-color images are layered. Consequently, the image quality is greatly degraded.

Figure 4:
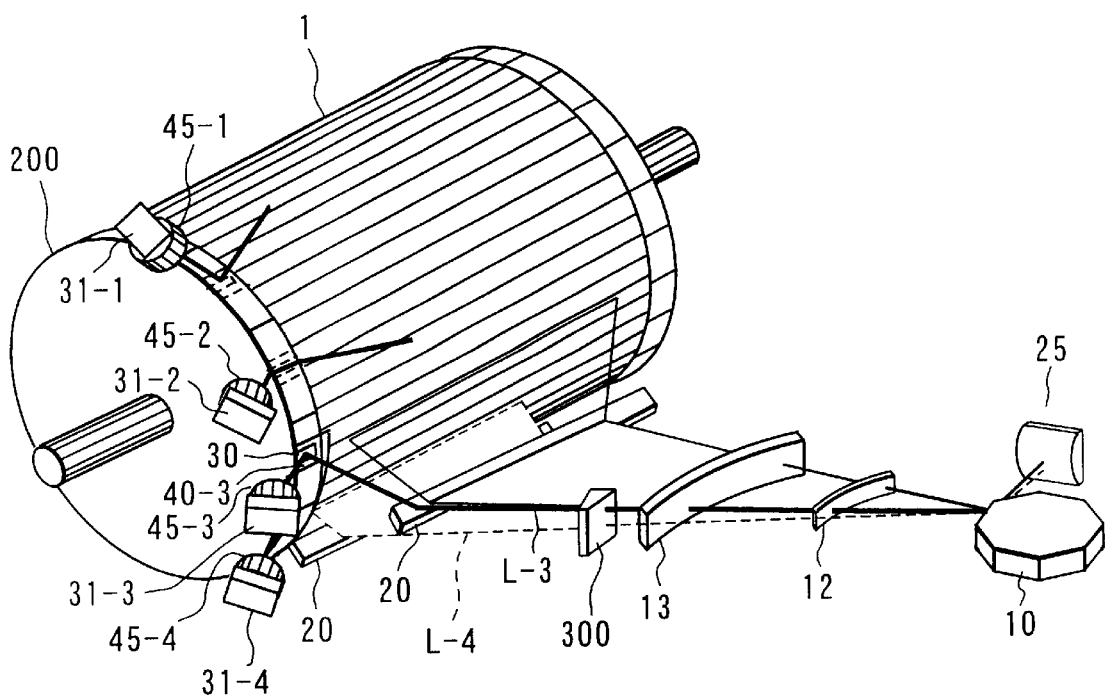
FIG. 4 is a perspective view showing the structure of a main part of the color image forming apparatus in the embodiment.

To reduce such image layering dislocation particularly in the sub-scanning direction, in the present embodiment, a light reflector 30 for laser beams is provided on the surface of a flange 200 rotated together with the photosensitive drum 1, as shown in FIG. 4. In addition, a deflector such as an optical element 300 is provided at a part of the scanning range of each laser beam such that each laser beam exactly irradiates the surface of the light reflector 30.

That is, the optical element 300 deflects the exposure laser beams L-1 to L-4 such that these beams are guided to an orbit on which the light reflector 30 moves. In this manner, each of the exposure laser beams L-1 to L-4 is irradiated once onto the light reflector 30 for every one rotation of the photosensitive drum 1.

Also, light detectors 31-1 to 31-4 are provided to detect respectively the reflection lights 40-1 to 40-4 of the exposure laser beams L-1 to L-4 from the light reflector 30. Image forming timings of respective single-color images are determined in synchronization with detection signals from the light detectors 31-1 to 31-4.

In order to improve the installation precision of the light detectors 31-1 to 31-4 to a negligible level relative to the tolerable image layering error of 0.1 mm, the light detectors 31-1 to 31-4 are assembled in a light detector holder not shown.

To simplify the explanation, FIG. 4 shows only two beams L-3 and L-4 of the four exposure laser beams L-1 to L-4 and only one reflection light 40-3 of the reflection lights 40-1 to 40-4 of the laser beams L-1 to L-4 from the light reflector 30. The return structure of each of the laser beams L-1 to L-4 is also simplified in this figure.

By scanning the surface of the photosensitive drum 1 with the exposure laser beams L-1 to L-4 deflected by the polygon mirror 10, reflection lights 40-1 to 40-4 (40-1, 40-2, and 40-4 of which are omitted from the figure) are generated when the laser beams L-1 to L-4 pass through the light reflector 30. Since the light reflector 30 is provided on the surface of the flange 200 of the photosensitive drum 1, the light reflector 30 relatively moves with respect to the laser beams L-1 to L-4 in accordance with rotation of the photosensitive drum 1. Then, the light detectors 31-1 to 31-4 detect respectively the reflection lights 40-1 to 40-4 when the light reflector 30 moves to the scanning positions of the respective laser beams L-1 to L-4. In accordance with detection signals from the light detectors, exposure timings of the laser beams L-1 to L-4 are determined respectively.

In this manner, electrostatic latent images formed on the photosensitive drum 1 by the laser beams L-1 to L-4, i.e., the single-color images are formed at positions, with the light reflector 30 taken as a reference. As a result of this, even if orientated positions of the laser beams L-1 to L-4 on the photosensitive drum 1 are dislocated from each other, the image forming positions of the single-color images are equal with respect to the photosensitive drum 1. Accordingly, image layering dislocation of a color image formed on the photosensitive drum 1 can be eliminated.

Figure 5:
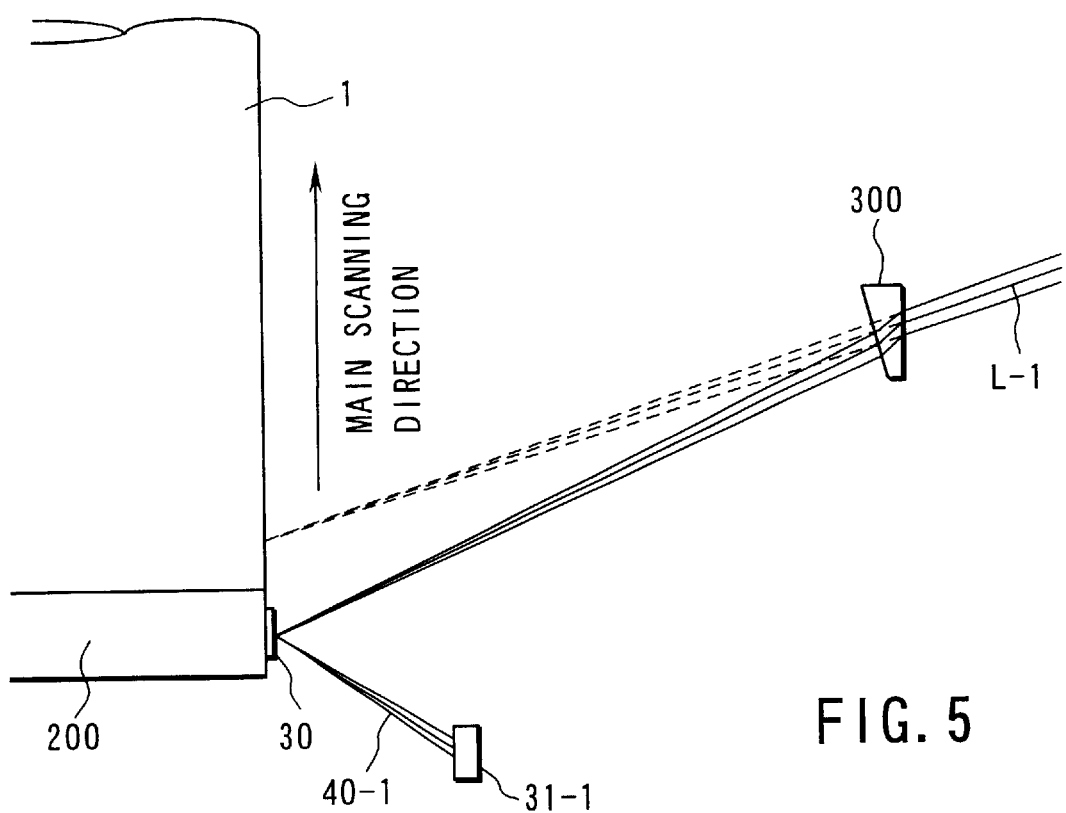
FIG. 5 is a view for explaining the structure of a deflector for irradiating a light reflector provided at a flange in the embodiment.

Meanwhile, the scanning widths of the laser beams L-1 to L-4 scanning the photosensitive drum 1 are increased by the optical element 300 as a deflector. This optical element 300 is constructed, for example, by a wedge-like glass plate as shown in FIG. 5. By setting this lens on the light path corresponding to an end portion of the scanning width of each laser beam, the lens causes deflection when each laser beam is transmitted through the lens, so that the image forming position can be shifted to the outside of the scanning range of the beam image forming position when the optical element 300 is not present.

Figure 6:
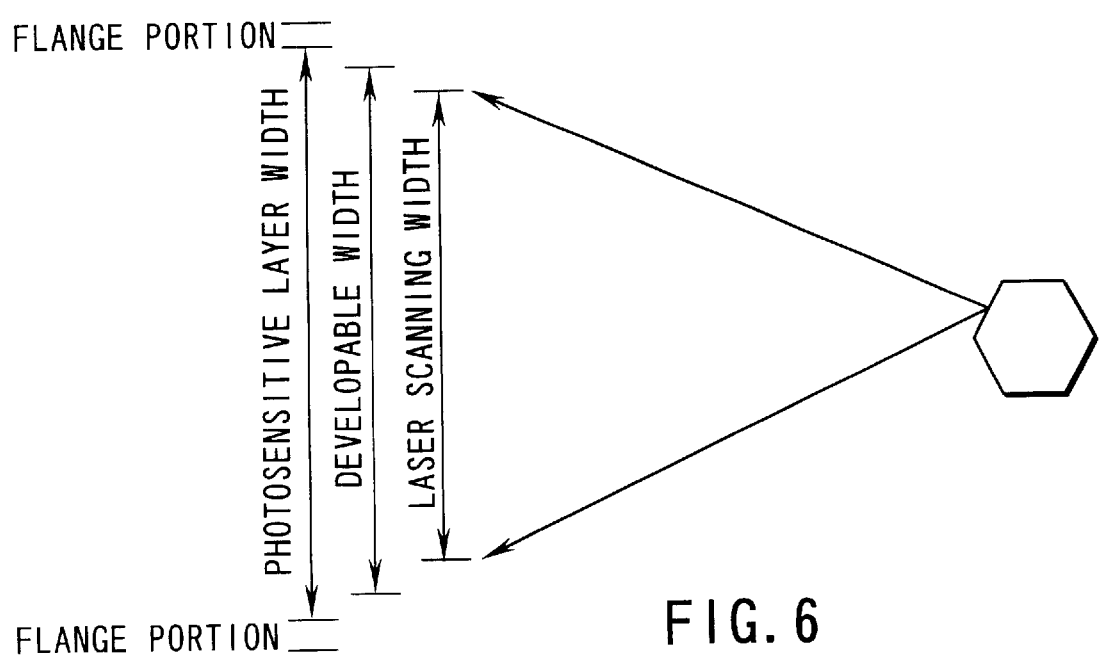
FIG. 6 is a view for explaining the photosensitive layer width, developable width, and laser scanning width in the embodiment.

The scanning width of each laser beam is set to be substantially equal to the printable area due to limitations from the outer shape of the lens and the lens cost, as shown in FIG. 6. Also, the developable width of the developing device is set to cover the scanning width. Further, the width of the photosensitive layer is set to cover the developable width. In this general setting, it is difficult to irradiate laser beams onto the surface of the light reflector 30 provided at the flange 200. In the present embodiment, however, irradiation onto the light reflector 30 is enabled by using the optical element 300 as a deflector.

The laser beams L-1 to L-4 pass through one same polygon mirror 10 and fθ lenses 12 and 13, and are thereafter returned by the mirrors 20 (20-1 to 20-8 in FIG. 1) such that the beams are oriented to predetermined positions on the photosensitive drum 1. Since the above-described optical element 300 as a deflector is arranged such that all of the four laser beams L-1 to L-4 pass through the optical element 300 immediately after they pass the lens 13, the laser beams L-1 to L-4 are all deflected in one same manner. In case where one single deflector is thus provided, it is possible to reduce much more variants of optical characteristics between individual deflectors and variants of deflection positions due to variants of assembly precision, compared with a case where deflectors are provided respectively for the laser beams. Detection of reflection light from the light reflector 30 can be achieved with high precision, so that image layering can be realized with high precision.

Figure 7:
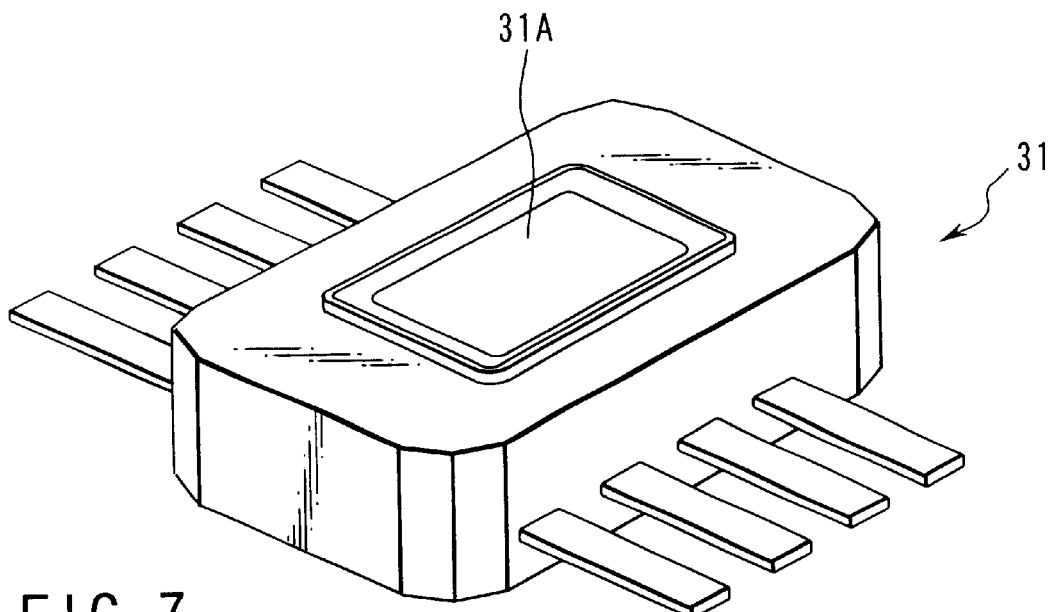
FIG. 7 is a perspective view showing a schematic structure of a light detector in the embodiment.

FIG. 7 shows each structure of the light detectors 31-1 to 31-4. Each light detector 31 is constructed by, for example, a silicon photodiode, and generates an electric signal in correspondence with light incident to the light receiving surface 31A.

Figure 8:
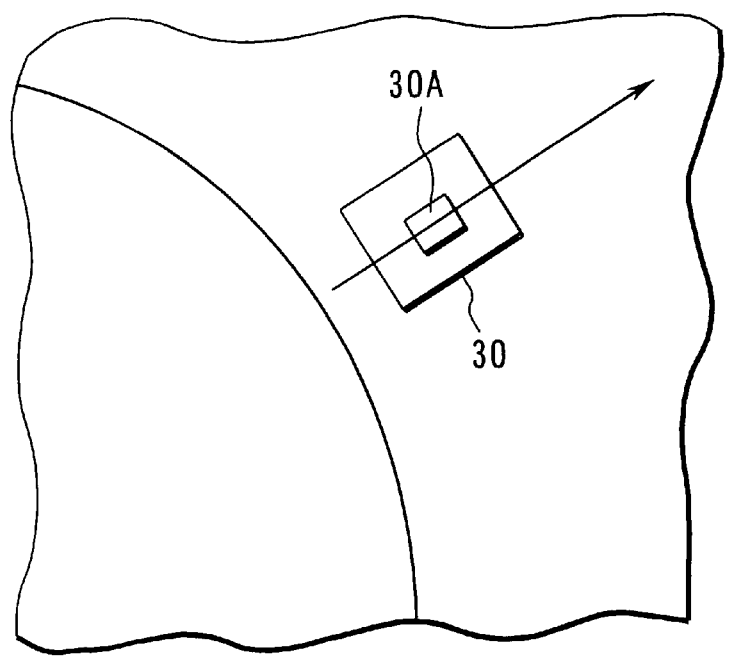
FIG. 8 is an enlarged view for explaining the light reflector in the embodiment.

FIG. 8 is an enlarged view of the light reflector 30 shown in FIG. 4. In the present embodiment, a mask 30A having a micro small hole of 0.1 mm square is adhered to a mirror thereby to form a micro small reflection surface. This light reflector 30 is embedded in and adhered to the flange 200. This micro small reflection surface is scanned with a laser beam thereby to obtain reflection light. This reflection is detected by the light detector 31 thereby to obtain a reflection light detection signal pulse from which an image forming start signal is generated.

Figure 9:
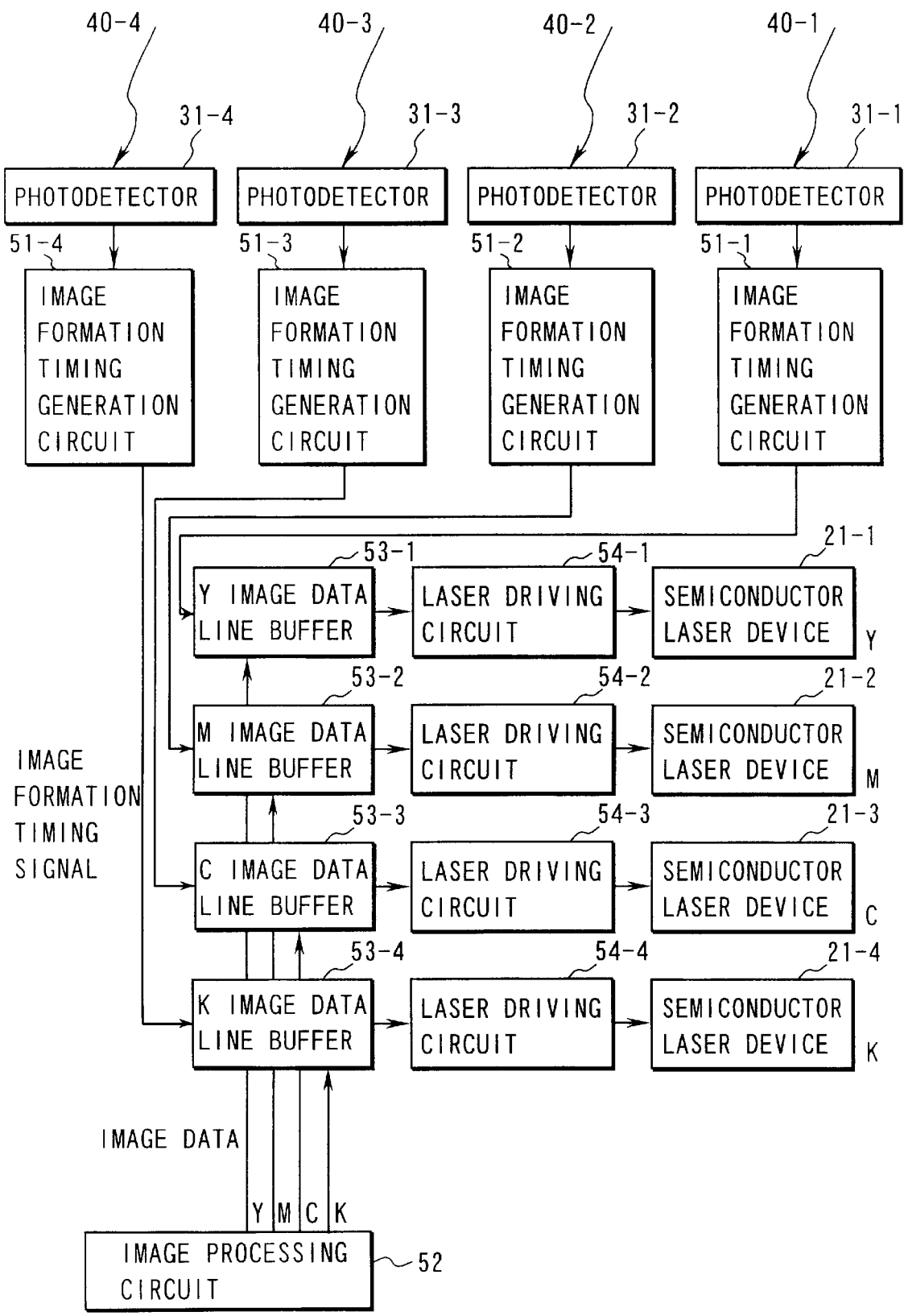
FIG. 9 is a block diagram showing the structure of a control circuit having a function to determine an image forming timing, based on a detection signal from a plurality of light detectors in the embodiment.

With reference to FIGS. 9, 10A and 10B, explanation will now be made of a method for controlling image forming timings in accordance with detection signals from the light detector 31.

FIG. 9 is a block diagram showing the configuration of the control circuit having a function to determine image forming timings in synchronization with detection signal from the light detectors 31-1 to 31-4. FIGS. 10A and 10B are timing charts which show the operation of the control circuit.

As described above, reflection lights 40-1 to 40-4 from the light reflector 30 (not shown in FIG. 9) provided on the surface of the flange 200 are detected by the light detectors 31-1 to 31-4, and detection signals are outputted. The detection signals are generated cyclically at the same time interval as the time period which is taken for the photosensitive drum 1 to move relatively from one to another of the four exposure laser beams L-1 to L-4 oriented to the photosensitive drum 1. The image forming timing generation circuits 51-1 to 51-4 generate sequentially generate image forming timing signals (write timing signals for electrostatic latent images) for forming single-color images of Y, M, C, and K, in synchronization with the detection signals, respectively.

Meanwhile, image data of a color image to be outputted is separated into single-color image data items of Y, M, C, and K by an image processing circuit 52. Those parts of the image data items that correspond to several scanning operations of the exposure laser beams L-1 to L-4 are respectively stored into line buffers 53-1 to 53-4 in advance. Further, single-color image data signals are transferred from the line buffers 53-1 to 53-4 to the laser drive circuits 54-1 to 54-4, in synchronization with the image forming timing signals. The semiconductor laser devices 21-1 to 21-4 are driven by laser drive circuits 54-1 to 54-4 and output the exposure laser beams L-1 to L-4 subjected to flicker control (modulation) in accordance with the single-color image data signals, thereby to form electrostatic latent images on the photosensitive drum 1.

FIG. 10B shows an enlarged image forming timing signal for forming a Y image. Also shown therein are a scanning timing signal indicating a timing at which the semiconductor laser device 21-1 is driven by the laser drive circuit 54-1, and an image data signal. In this example, a time delay represented by τ occurs from a rising edge of the image forming timing signal to a generation timing of a scanning timing signal immediately thereafter. This time delay τ is a scanning cycle T at most, which is sufficiently small with respect to a tolerable layering dislocation amount (e.g., 0.1 mm) and causes no problems.

By thus detecting reflection light from the light reflector 30 by means of the light detectors 31-1 to 31-4 and by driving the semiconductor laser devices 21-1 to 21-4 in synchronization with the detection signals from the light detectors 31-1 to 31-4, the forming positions of the electrostatic latent images on the photosensitive drum 1, which are respectively based on the exposure laser beams L-1 to L-4, i.e., the forming positions of the single-color images of Y, M, C, and K are the same positions with reference to the light reflector 30. Accordingly, the color image obtained by layering the respective single-color images does not substantially cause an image layering error but can be outputted with high image quality.

Next, a modification example of the deflector shown in FIG. 5 will be explained with reference to FIG. 11.

In this modification example, the deflector is constructed by a mirror 300-1 and a half-mirror 300-2 in place of the optical element 300 shown in FIG. 5. That is, as shown in FIG. 11, the mirror 300-1 is provided at an end portion of the scanning width of the laser beams such that the laser beam reflected by this mirror is irradiated onto the light reflector 30 and the light detector 46 through the half-mirror 300-2. In this case, the mirror 47 shown in FIG. 2 is unnecessary. Note that the half-mirror 300-2 may be replaced with a normal mirror with the mirror 47 kept provided.

The laser beam reflected by the half-mirror 300-2 is securely irradiated onto the surface of the light reflector 30, like the case of the optical element 300 shown in FIG. 5. The laser beam which is transmitted through the half-mirror 300-2 is irradiated onto the light detector 46. The detection signal from the light detector 46 corresponds to a scanning timing signal generated for every scanning operation in the main scanning direction, and is used to determine a image write timing. In synchronization with this detection signal, the laser beam is subjected to flicker control (modulation) based on image data for one line, thereby to form an image of one line.

The time lags between the detection signals from the light detectors 31-1 to 31-4 and the detection signals from the light detector 46 in the scanning direction are measured and recorded. Image formation is executed at a timing determined by correcting the detection signal of the light detector 46 in the scanning direction, by a measured time lag. High image layering precision can be thus obtained.

Thus, according to the first embodiment, a light reflector for laser beams is provided on the surface of a flange which is rotated together with a photosensitive drum, and a deflector is provided at a part of the scanning range of each laser beam such that each laser beam is irradiated exactly onto the surface of the light reflector. Therefore, electrostatic latent images on the photosensitive drum, which are formed respectively by the laser beams, i.e., single-color images are formed at positions with the light reflector taken as a reference. Accordingly, even if the orientated positions of the laser beams on the photosensitive drum are dislocated, the forming positions of the single-color images are equal with respect to the photosensitive drum, so that image layering dislocation in the color image formed on the photosensitive drum can be eliminated.

Explained next will be the second embodiment of the present invention.

The entire structure of the color image forming apparatus according to the second embodiment is the same as shown in FIG. 1.

Figure 12:
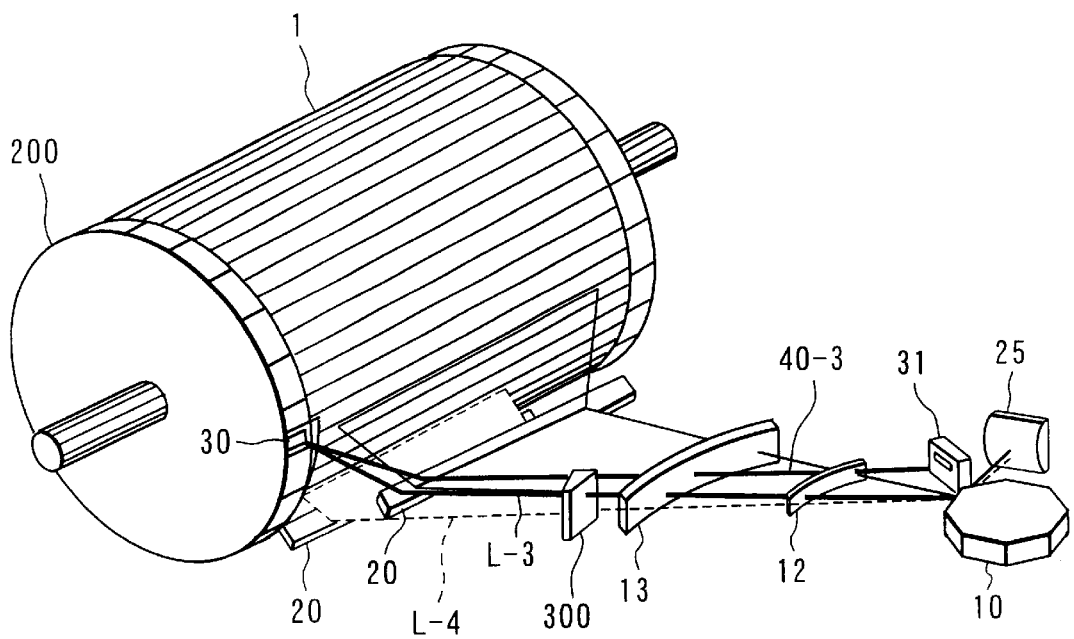
FIG. 12 is a perspective view showing the structure of a main part of a color image forming apparatus according to the second embodiment of the present invention.

FIG. 12 shows the structure of a main part of the color image forming apparatus according to the second embodiment of the present invention. Components common to the structure shown in FIG. 4 are denoted at common reference symbols and detailed explanation thereof will be omitted herefrom. Explanation will now be made mainly on those parts that are different from FIG. 4.

The second embodiment is arranged such that reflection lights 40-1 to 40-4 from the light reflector 30 provided on a flange 200 of a photosensitive drum 1 are transmitted through lenses 13 and 12 and irradiate a light detector 31 provided near the deflection surface of a polygon mirror 10.

The light detector 31 is provided at a position at which the optical distance is substantially equal to that of the deflection surface of the polygon mirror 10, so that laser beams diffused from the light reflector 30 are converged on the light receiving surface of the light detector 31 by the lenses 13 and 12.

Four exposure laser beams L-1 to L-4 are oriented to positions different from each other in the sub-scanning direction on the deflection surface of the polygon mirror 10. The light receiving surface 31A (see FIG. 7) of the light detector 31 should preferably have a sufficient width to detect all the reflection lights 40-1 to 40-4 at the detection position, distinguished from each other.

Figure 11:
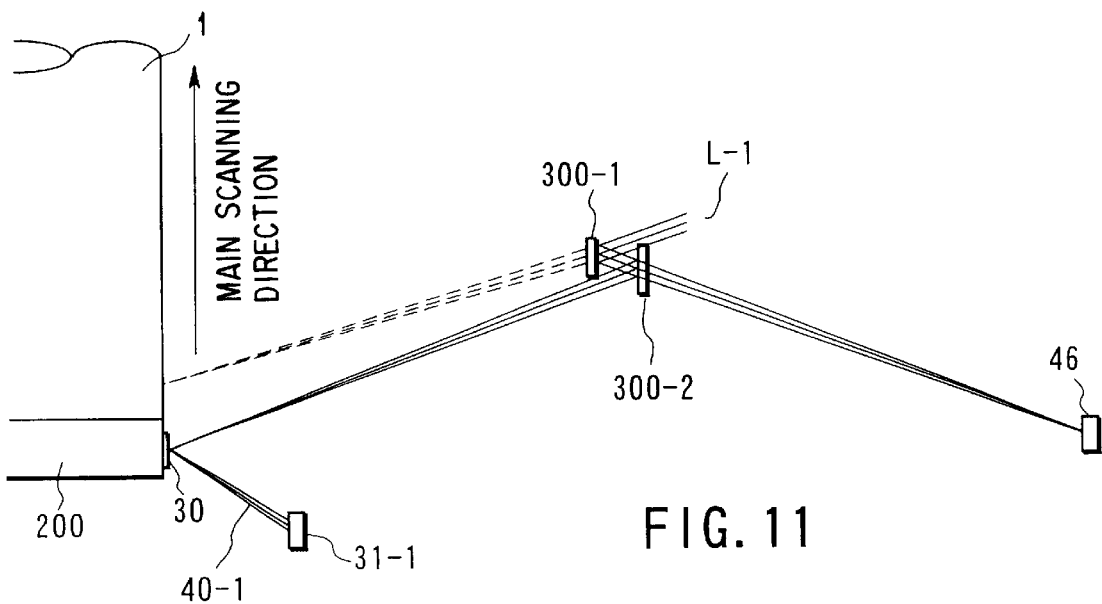
FIG. 11 is a view for explaining a modification example of the deflector shown in FIG. 5.

Also, in this second embodiment, the deflector may be constructed by the mirror 300-1 and the half-mirror 300-2 as shown in FIG. 11, in place of the optical element 300.

Figure 13:
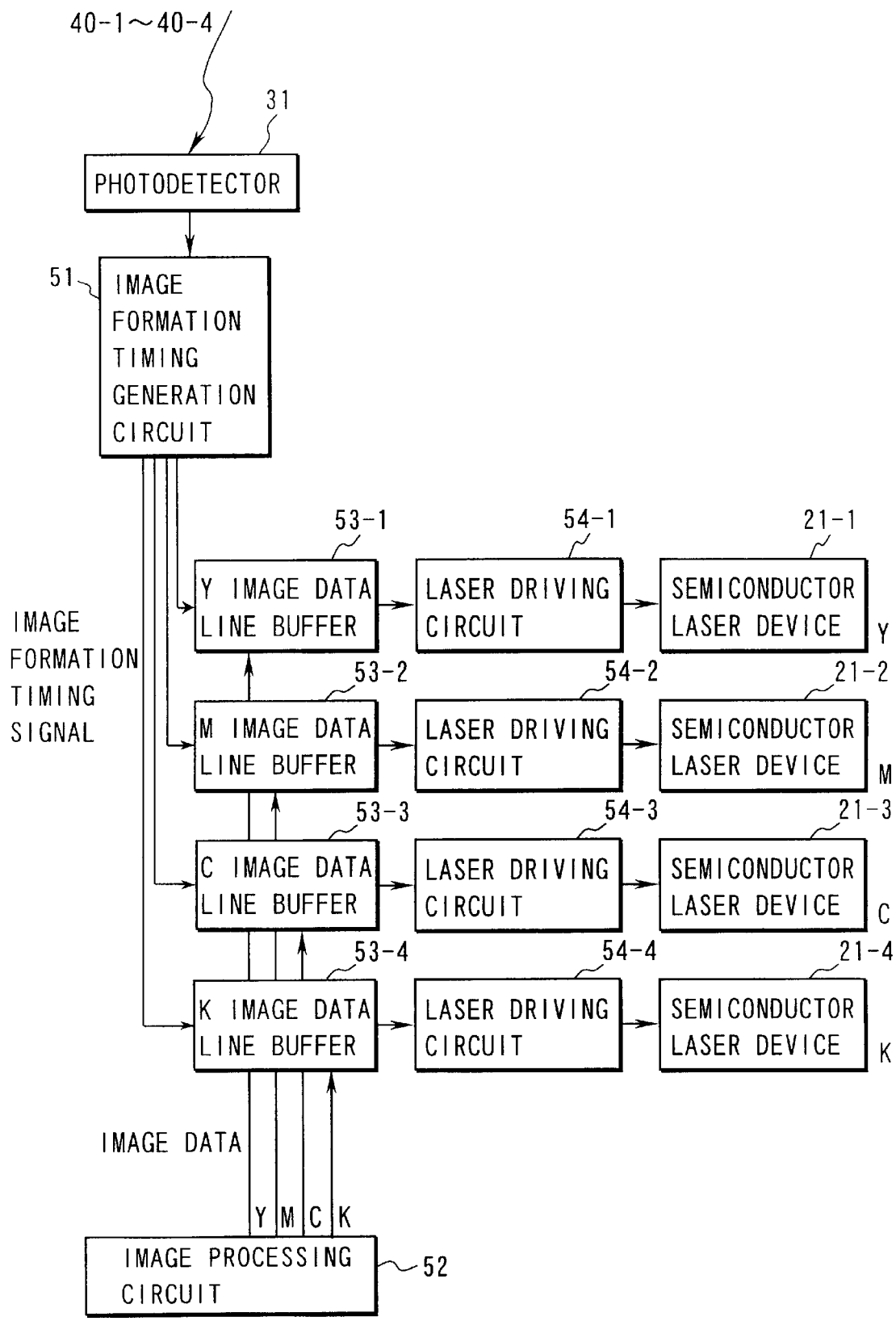
FIG. 13 is a block diagram showing the structure of a control circuit having a function to determine an image forming timing, based on a detection signal from one light detector in the second embodiment.

FIG. 13 is a block diagram showing the structure of a control circuit having a function of determining an image forming timing in synchronization with a detection signal from the light detector 31.

Reflection lights 40-1 to 40-4 from the light reflector 30 (not shown in FIG. 13) provided on the surface of the flange 200 are detected by the light detector 31, and detection signals are outputted. The detection signals are generated cyclically as shown in FIG. 10A, at the same time interval as the time period which is taken for the photosensitive drum 1 to move relatively from one to another of the four exposure laser beams L-1 to L-4 oriented to the photosensitive drum 1. An image forming timing generation circuit 51 sequentially generates sequentially image forming timing signals (write timing signals for electrostatic latent images) for forming single-color images of Y, M, C, and K, in synchronization with the detection signals, respectively.

Meanwhile, image data of a color image to be outputted is separated into single-color image data items of Y, M, C, and K by an image processing circuit 52. Those parts of the image data items that correspond to several scanning operations of the exposure laser beams L-1 to L-4 are respectively stored into line buffers 53-1 to 53-4 in advance. Further, single-color image data signals are transferred from the line buffers 53-1 to 53-4 to the laser drive circuits 54-1 to 54-4, in synchronization with the image forming timing signals. The semiconductor laser devices 21-1 to 21-4 are driven by laser drive circuits 54-1 to 54-4 and output the exposure laser beams L-1 to L-4 subjected to flicker control (modulation) in accordance with the single-color image data signals, thereby to form electrostatic latent images on the photosensitive drum 1.

Thus, according to the second embodiment, the reflections lights 40-1 to 40-4 from the light reflector 30 can be detected by one single light detector 31. Therefore, detection signal errors depending on variants of light detectors are not caused, so that variants of image write timings are eliminated. As a result, high image layering precision can be attained.

In addition to the embodiments described above, the structure may be arranged as follows. That is, a plurality of light reflectors may be provided in both end portions of the photosensitive drum, and reflection beam detection signals from both sides may be used to correct layering dislocation caused by an inclination of the laser beam scanning positions and layering dislocation caused by a laser beam scanning width magnification error. This structure can also be realized by using methods described above.

Although the above embodiments have been explained with reference to cases where each light detector uses a light detection element based on a silicon photodiode, any other element can be used as long as the element receives a laser beam and converts it into an electric signal.

Also, the above embodiments have been explained with reference to cases where an optical element made of a wedge-like glass or a mirror and a half-mirror are used as a deflector. However, any other element may be used as long as the element deflects laser beams.

As has been specifically explained above, according to the present invention, it is possible to correct image layering dislocation in a formed color image with high precision without providing a light reflector on the photosensitive layer, so that a high-quality color image can be attained at a high speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color image forming apparatus comprising:
    a photosensitive base which is rotatable and has a photosensitive layer on a surface of the photosensitive base and a reflecting surface on the surface of the photosensitive base, the reflecting surface being adjacent to the photosensitive layer;
    a scanning unit which scans a plurality of exposure light beams on the photosensitive base, the plurality of exposure light beams corresponding to respective latent images of different colors;
    a developing unit which develops the plurality of latent images;
    a deflecting unit which deflects the plurality of exposure light beams and guides the plurality of exposure light beams to the reflecting surface;
    a detecting unit which detects the plurality of exposure light beams reflected by the reflecting surface; and
    a controller, connected to the detecting unit and the scanning unit, configured to control timing of the scanning unit based on respective time points at which the plurality of exposure light beams are detected.

2. The apparatus according to claim 1, wherein the photosensitive base comprises a flange, and the reflecting surface is provided on the flange.

3. The apparatus according to claim 1, wherein the deflecting unit consists essentially of a single optical element which transmits the plurality of exposure light beams.

4. The apparatus according to claim 1, wherein the deflecting unit consists essentially of two mirrors which reflect the plurality of exposure light beams.

5. The apparatus according to claim 1, wherein the deflecting unit comprises a mirror which reflects the plurality of exposure light beams and a half-mirror which reflects and transmits the plurality of exposure light beams reflected at the mirror.

6. The apparatus according to claim 5, further comprising a second detecting unit which detects the plurality of exposure light beams transmitted through the half-mirror, the controller connected to the second detecting unit and the scanning unit and configured to determine a scanning start timing of the scanning unit based on respective time points when the plurality of exposure light beams are detected by the second detecting unit.

7. The apparatus according to claim 1, wherein the detecting unit comprises a single light detector.

8. The apparatus according to claim 1, wherein the detecting unit comprises a plurality of light detectors provided corresponding to respective one of the plurality of exposure light beams.

9. A color image forming apparatus comprising:
    a photosensitive base which is rotatable, the photosensitive base comprising a photosensitive surface, a non-photosensitive surface, and a reflecting surface formed on the non-photosensitive surface;
    a scanning unit which scans a plurality of exposure light beams on the photosensitive base, the plurality of exposure light beams corresponding to respective latent images of different colors;
    a developing unit which develops the plurality of latent images;
    a deflecting unit which increases width of the scanning of the plurality of exposure light beams and provides the plurality of exposure light beams onto the reflecting surface;
    a detecting unit which detects the plurality of exposure light beams reflected by the reflecting surface; and
    a controller connected to the scanning unit and the detecting unit, and configured to determine respective timings of scanning of the scanning unit based on respective time points when the plurality of exposure light beams are detected.

10. The apparatus according to claim 9, wherein the photosensitive base comprises a flange, and the reflecting surface is provided on the flange.

11. The apparatus according to claim 9, wherein the deflecting unit consists essentially of a single optical element which transmits the plurality of exposure light beams.

12. The apparatus according to claim 9, wherein the deflecting unit consists essentially of two mirrors which reflect the plurality of exposure light beams.

13. The apparatus according to claim 9, wherein the deflecting unit comprises a mirror which reflects the plurality of exposure light beams and a half-mirror which reflects and transmits the plurality of exposure light beams reflected at the mirror.

14. The apparatus according to claim 13, further comprising a second detecting unit which detects the plurality of exposure light beams transmitted through the half-mirror, the controller connected to the second detecting unit and the scanning unit and configured to determine a scanning start timing of the scanning unit based on respective time points when the plurality of exposure light beams are detected by the second detecting unit.

15. The apparatus according to claim 9, wherein the detecting unit comprises a single light detector.

16. The apparatus according to claim 9, wherein the detecting unit comprises a plurality of light detectors provided corresponding to respective one of the plurality of exposure light beams.

17. An image forming timing control method applied to color image formation with a photosensitive base, wherein the photosensitive base includes a photosensitive surface and a reflecting surface, the reflecting surface being adjacent to the photosensitive surface, the method comprising:

scanning a plurality of exposure light beams onto the reflecting surface using a deflection unit;

detecting the plurality of exposure light beams reflected by the reflecting surface; and controlling timing of the scanning of the plurality of exposure light beams on the photosensitive base, based on respective time points at which the plurality of exposure light beams are detected.

18. The method according to claim 17, further comprising:

increasing a scanning width of the plurality of exposure light beams.

* * * * *